United States Patent [19]
Puritz et al.

[11] 4,244,669
[45] Jan. 13, 1981

[54] CUTTER HEAD FOR CUTTING TEMPLATES FROM CARDBOARDS, PLASTICS, AND THE LIKE

[75] Inventors: Wolfgang Puritz, Buxtehude; Gerhard Voss, Hamburg-Schenefeld, both of Fed. Rep. of Germany

[73] Assignee: Aristo-Werke Dennert & Pape KG (GmbH & Co.), Hamburg, Fed. Rep. of Germany

[21] Appl. No.: 915,620

[22] Filed: Jun. 15, 1978

[30] Foreign Application Priority Data

Jun. 25, 1977 [DE] Fed. Rep. of Germany ....... 2728794

[51] Int. Cl.³ .......................... B23C 5/02; B23C 5/26
[52] U.S. Cl. ............................... 409/137; 144/136 R; 144/240; 144/242 A; 407/30; 407/53; 408/58; 409/190; 409/232
[58] Field of Search .............. 90/12 D, 11 A, DIG. 3; 144/136 R, 134 D, 219, 220, 240, 242 A; 408/56, 58, 67, 95; 407/30, 53, 54; 409/231–234, 137, 185, 190, 191

[56] References Cited

U.S. PATENT DOCUMENTS

| | | | |
|---|---|---|---|
| 1,745,780 | 2/1930 | Casey | 144/134 D |
| 2,350,704 | 6/1944 | Schnable | 90/DIG. 3 |
| 2,527,968 | 10/1950 | Sherman et al. | 408/56 X |
| 3,126,793 | 3/1964 | Jennings et al. | 407/120 X |
| 3,581,787 | 6/1971 | Bane | 144/134 D |
| 3,587,391 | 6/1971 | Pitts et al. | 90/11 A |

*Primary Examiner*—Z. R. Bilinsky
*Attorney, Agent, or Firm*—Becker & Becker, Inc.

[57] ABSTRACT

A cutter head for cutting templates from cardboards, plastics, and the like, which includes a high speed rotatable cutting stylus, and a holding-down device for holding down the material from which the templates are to be cut out. The holding-down device surrounds the cutting stylus and is firmly but adjustably connected to a non-rotatable but axially freely movable member of the cutter head.

1 Claim, 4 Drawing Figures

CUTTER HEAD FOR CUTTING TEMPLATES FROM CARDBOARDS, PLASTICS, AND THE LIKE

The present invention relates to a cutter head for cutting templates out of cardboard, plastic material and the like, which comprises a cutting spindle rotating at high speed and furthermore comprises a device for holding down the material to be cut. Cutter heads of the above mentioned type are used for instance when manufacturing templates for the tailoring trade, especially for the clothing industry. The cardboard plates or sheets to be cut by the cutter are preferably arranged on the table of a coordinatograph over which the cutter head is displaceable in longitudinal and transverse direction and can be moved in conformity with an electronically controlled program.

With the heretofore known cutter heads, the cutting stylus is fixedly connected with the device for holding down the material to be cut, and the cutting stylus rotated together with the cutter spindle. In this connection, the said device defines the penetration depth of the stylus into the material to be cut. With the heretofore known arrangement the structural member of the cutter head which comprises the bearing for the cutting stylus and the drive, is firmly chucked so that the cutter spindle has no possibility to deviate or escape upwardly or downwardly.

The above mentioned heretofore known cutter head arrangement has numerous drawbacks. Due to the fact that the device for holding down the material to be cut likewise rotates, a high moment of inertia is obtained and due to the connection of the stylus on said device, additionally a high unbalance is created simultaneously with a corresponding noise development. For these reasons, it was necessary to limit the spindle speed to a relatively low speed. As a result thereof, the above mentioned known arrangement had poor cutting quality and the tendency easily to fail because no escape was possible when the cutting table was uneven. A further drawback of said known device was seen in the fact that the surface of the holding-down device wore quickly and generated heat to a great extent which heat then in an undesired manner also reached the stylus. In this way, sometimes the material to be cut burned within the region of the holding-down device.

It is, therefore, an object of the present invention to provide a cutter head for cutting templates of cardboard and the like, which will overcome the above mentioned drawbacks.

This and other objects and advantages of the invention will appear more clearly from the following specification in connection with the accompanying drawing, in which.

The cutter head according to the invention is characterized primarily in that the device for holding down the material to be cut is firmly connected to a structural element of the cutter head which structural element comprises the bearing for the cutting stylus. The said structural member of the cutter head is axially freely movable but does not rotate. Preferably, the said device is cup-shaped while the bottom of the cup has a passage opening for the cutting spindle, and while the metal surface of the cup is screwed by means of a thread into the non-rotating structural member of the cutter head so as to be adjustable as to height.

According to a further feature of the present invention, the non-rotating part of the cutter head is freely movable in axial direction in a down-holding device in an outer guiding means surrounding the device for holding down the material to be cut and also comprising the cutter spindle. The outer guiding means comprises substantially radially directed connecting bores for a suction pump. In this connection, also the device for holding down the material to be cut comprises substantially radially directed chip withdrawing openings. The air supply to the cutter head is preferably effected through the intervention of substantially radially directed air feeding openings located on that end face of the guiding means which faces toward the material to be cut.

In view of a very great quietness of running also at very high speed, the tip of the cutting stylus is limited substantially over half the circumference of a conical surface which for forming cutting edges is followed by a substantially plane surface which extends at an acute angle to the axis of the stylus. This substantially plane surface is passed by the stylus axis above the geometric tip of the conical surface.

Figure 1:
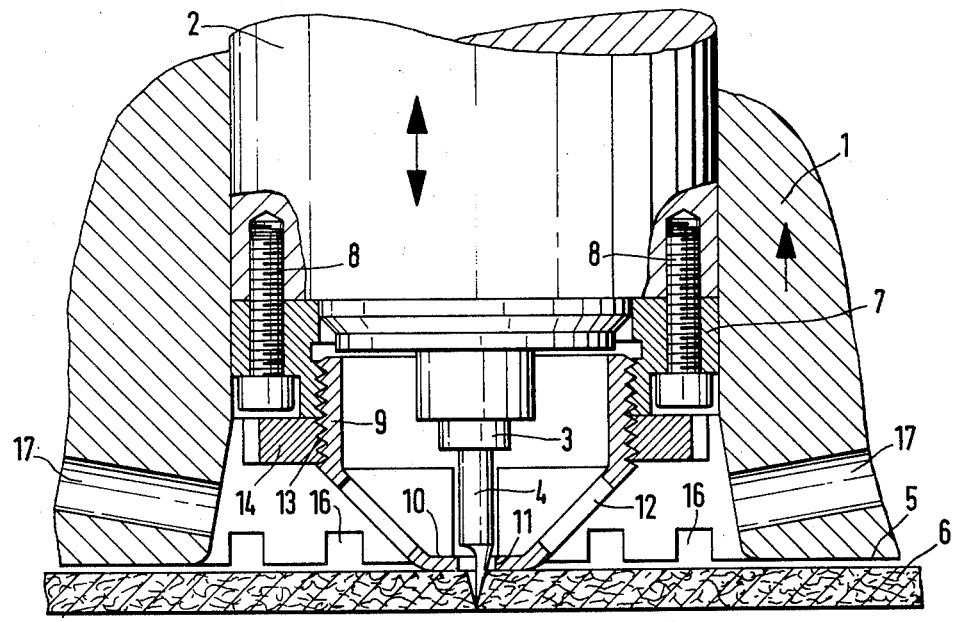
FIG. 1 is a diametrically cut side view of the front end of a cutter head according to the invention.

Referring now to the drawings in detail, the cutter head illustrated in FIG. 1 comprises axial guiding or transport means 1 the inner cylindrical bores of which receive the axially moveable spindle member 2 so that the latter will be longitudinally displaceable in the bore. The spindle 2 represents the cutter head proper with the motor not shown in detail, the water cooling system, the chucking device 3 and the journalling of the cutter spindle axle, as well as the cutter stylus 4 proper. Of the motor which preferably is a water cooled electric motor, only the portion 3a is shown, but instead also a compressed air operated turbine may be used.

The axial guiding means 1, during operation of the cutter is lowered relative to a non-illustrated holding member to such an extent that the end face 5 will be located in slight relationship to and above the surface of the material to be cut. The structural member 2 which will furtherbelow be described in greater detail is by its own weight, if desired by the interposition of an adjustable spring relief, held on the surface of the material 6. The cut is made by moving the transport means over the surface of the material while in spaced relation therewith whereby the cutting head moves the cutting stylus through the material so as to make a linear cut therein.

At the lower end face of the structural member 2, there is provided a bearing ring 7 connected by means of threaded screws 8. The bearing ring 9 is intended to hold the cup-shaped holding-down device or foot 9. This holding-down device or foot has its lower end designed conically and by means of a relatively small end face or bottom surface 10 surrounds the front end of the cutter stylus for which the end face 10 is provided with a central bore 11 and extends away from the stylus over a relatively small area for holding the material as the material is cut. In the conical walls of the holding-down or foot device 9 which connects the foot to the spindle 2 there are provided substantially radially directed openings 12 by means of which the chips or scraps formed during the milling or cutting operation can be withdrawn. The holding-down device 9 has its upper mantle surface provided with an outer thread 13 which is adapted to be screwed into a corresponding inner thread of the bearing ring 7. By means of this screw connection, it is possible to adjust as to height the holding-down device 9 relative to the tip of the cutter stylus. In order to secure a once selected adjustment as to height, a counter nut 14 is provided on the outer thread 13 of the holding-down device 9. The circumference of the counter nut 14 is provided with corresponding wrench notches 15 for engagement by a tool.

In the lower end face of the axial guiding means 1 there are provided radially directed grooves 16, while at the side walls of the axial guiding means 1 there are provided substantially radially directed connecting bores 17 for connecting thereto a suction pump. When the arrangement is in operation, the surrounding air enters at the radial groove 16 and can be withdrawn together with the milling chips or scraps through the connecting bores 17.

Figure 3:
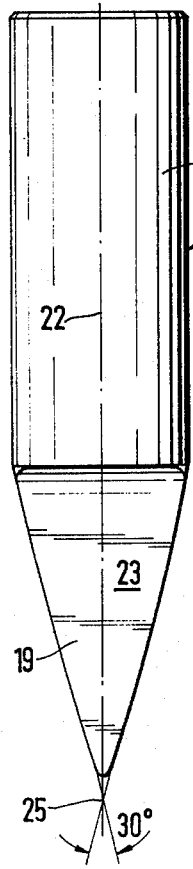
FIG. 3 is a front view of a cutter stylus according to the invention.
Figure 2:
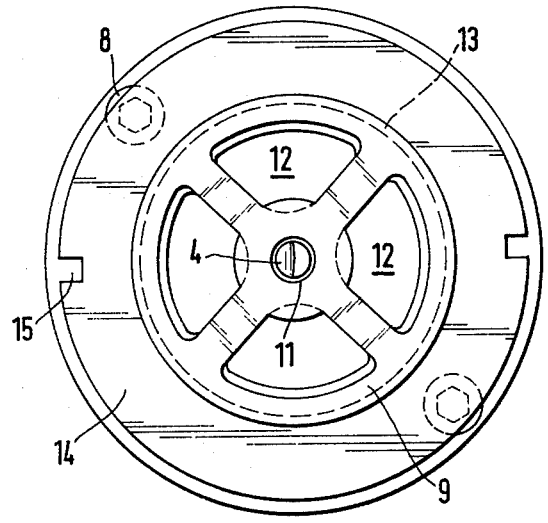
FIG. 2 is a bottom view of FIG. 1 without the axial surrounding guiding means pertaining thereto.
Figure 4:
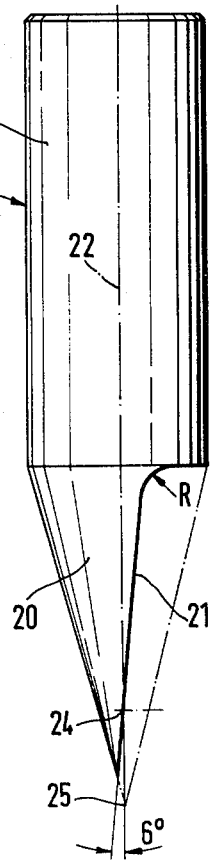
FIG. 4 is a side view of FIG. 3.

In order to be able to operate the cutter head a high speeds, the cutter stylus has to have a relatively high speed. In order that the cutting stylus 4 will also at very high speeds run very quietly, the cutting stylus 4 is designed as indicated in FIGS. 3 and 4. Provided on a cylindrical shank 18 having a diameter of approximately 3mm is a substantially conical tip 19 which is limited substantially over half the circumference of a conical section 20. The conical cutting portion having a surface which is a section 20 of a core cone is followed by a substantially plane surface 23 which for purposes of forming cutting edges 21 extends at an acute angle of approximately 6° with regard to the natural apex of the edges 21 of the cutting stylus. This plane surface 23 extends through the axis 22 of the stylus at 24 above the geometric tip 25 of the conical section 20 and is created by removing a section of the cone. The cutting edges 21 occur at the juxture of the remaining portion or section 20 of the cone and the removed portion. The point 24 is with a tip length of 6mm located at a distance of approximately 15mm from the geometric tip 25 of the conical surface 20. The merging area of the plane surface 23 with the cylindrical stylus section 18 is, as indicated in FIG. 3 and designated R, ground in a cylinder mantle shaped manner. In view of this design of the cutter stylus and the stationary, in other words non-rotating, arrangement of the holding-down device 9, no moment of inertia can occur but only a very slight unbalance as a result of the ground surface of the cutting stylus. Consequently it will be possible with the cutter according to the present invention to cut at a very high speed and to obtain a high cutting quality. When an unevenness of the cutting table is encountered, the spindle 2 is able to yield in axial direction. It should also be noted that for all practical purposes, no heat development occurs so that consequently no heat has to be conducted away by means of the stylus. In view of the screw connection of the holding-down device 9 in the front end of the spindle 2, a very precise and easily settable adjustment of the cutting depth will be possible.

An improvement in the withdrawal of chips and scraps is, if necessary, possible by additional passages in the structural member 1 and in the bearing ring 7. These passages directly connect the suction connecting bore 17 with the inner chamber of the holding-down device.

It is, of course, to be understood that the present invention is, by no means, limited to the specific showing in the drawings, but also comprises any modifications within the scope of the appended claims.

What is claimed is:

1. A cutter head for cutting templates from plastic and cardboard material in accordance with electronically controlled programs, the cutter head comprising:

support means positioned in spaced relation to the material and having a bore therethrough;

spindle means axially moveable in the bore for engaging the cutter head with the material;

a cutting stylus mounted at one end of said spindle for rotation with respect thereto, said cutting stylus having a cylindrical shank portion defining an axis of rotation and a cutting blade portion, said cutting blade portion defined over half of its circumference by a conical surface sloped at about thirty degrees with respect to the axis, generated about a base of about three millimeters and intersected by a planar surface extending at an angle of about six degrees with respect to the axis of the cutting stylus to form cutting edges, said planar surface intersecting said conical surface at a point before the geometric apex of the conical surface, and said cutting blade portion having a length of about six millimeters;

means for rotatably holding the stylus with respect to the spindle means, said holding means being attached to the cylindrical shank portion;

a foot having a cylindrical bore therethrough closely complementing and extending over a length of the cylindrical shank portion of the stylus for stabilizing the stylus as the stylus rotates in the bore; said foot having a bottom surface surrounding and adjacent to the cutting blade portion of the stylus and extending away from the cutting blade over a relatively small area for holding the material as the material is cut inside of the area; said foot further having a portion for connecting the bottom surface to the axially moveable spindle, said connecting means having radial openings through which cutting scraps pass, and means in said support means for carrying away cutting scraps that pass through the radial openings in the connecting means.

* * * * *